US010083381B2

(12) United States Patent
Bermundo

(10) Patent No.: US 10,083,381 B2
(45) Date of Patent: Sep. 25, 2018

(54) REMOTE OVERRIDE OF POWER SAVING MODE

(71) Applicant: KYOCERA Document Solutions Inc., Osaka (JP)

(72) Inventor: Neil-Paul Bermundo, Glendora, CA (US)

(73) Assignee: KYOCERA Document Solutions Inc., Osaka (JP)

( * ) Notice: Subject to any disclaimer, the term of this patent is extended or adjusted under 35 U.S.C. 154(b) by 0 days.

(21) Appl. No.: 15/282,701

(22) Filed: Sep. 30, 2016

(65) Prior Publication Data
US 2018/0096236 A1    Apr. 5, 2018

(51) Int. Cl.
*G06F 15/00* (2006.01)
*G06F 3/12* (2006.01)
*G06K 1/00* (2006.01)
*G06F 1/00* (2006.01)
*G06K 15/00* (2006.01)
*H04N 1/00* (2006.01)

(52) U.S. Cl.
CPC ....... *G06K 15/406* (2013.01); *H04N 1/00896* (2013.01); *H04N 2201/0094* (2013.01)

(58) Field of Classification Search
CPC ............. G06K 15/406; H04N 1/00896; H04N 2201/0094
USPC ............................... 358/1.14, 1.13, 1.15, 1.1
See application file for complete search history.

(56) References Cited

U.S. PATENT DOCUMENTS 6,304,926 B1   10/2001  Itezono
6,611,350 B1    8/2003  Watanabe
7,184,976 B1    2/2007  Kumagai
(Continued)

FOREIGN PATENT DOCUMENTS

JP    2010-66907 A     3/2010
JP    2012-27520 A     2/2012
JP    2016-213704 A   12/2016

OTHER PUBLICATIONS

Applicant brings to the attention of the Examiner the fact that US 20160337535 A1 ("Ishida"), cited by the Examiner in the currently outstanding Nonfinal Office Action dated Jun. 13, 2017, is commonly owned by the present Applicant. Specifically, U.S. Appl. No. 15/148,673, which published as US 20160337535 A1 on Nov. 17, 2016 as well as its counterpart JP Application No. 2015-096542 filed May 11, 2015, which published as JP 2016-213704 A1 on Dec. 15, 2016, are commonly owned by the same Applicant/Assignee as in the present application.

*Primary Examiner* — Douglas Tran
(74) *Attorney, Agent, or Firm* — JTT Patent Services, LLC; Gerald T. Peters

(57) ABSTRACT

A remote override system may comprise a remote device and a local device. The remote device may include a remote device computer having a remote device processor and a remote device communication interface, and an outgoing override signal handler capable of sending an override signal by way of the remote device communication interface. The local device may include a local device computer having a local device processor and a local device communication interface, and an incoming override signal handler capable of receiving the override signal by way of the local device communication interface. The override signal may be capable of causing override of a power saving mode at the local device.

19 Claims, 6 Drawing Sheets

(56) References Cited

U.S. PATENT DOCUMENTS

| | | | |
|---|---|---|---|
| 9,179,109 B1* | 11/2015 | Kasmir | G08B 3/10 |
| 2003/0056133 A1* | 3/2003 | Talley | G06F 3/04817 |
| | | | 713/323 |
| 2005/0271410 A1 | 12/2005 | Namizuka et al. | |
| 2009/0097062 A1 | 4/2009 | Hayashi | |
| 2012/0023551 A1 | 1/2012 | Kawasumi | |
| 2012/0105885 A1 | 5/2012 | Nitta | |
| 2013/0010326 A1* | 1/2013 | Mochizuki | G06F 1/3209 |
| | | | 358/1.15 |
| 2013/0318383 A1* | 11/2013 | Takizawa | G06F 1/3234 |
| | | | 713/323 |
| 2015/0074365 A1 | 3/2015 | Uehara | |
| 2015/0369783 A1 | 12/2015 | Hamada | |
| 2016/0337535 A1* | 11/2016 | Ishida | H04N 1/00344 |

* cited by examiner

REMOTE OVERRIDE OF POWER SAVING MODE

FIELD OF THE INVENTION

The present invention relates to methods, systems, and devices for remote override of the power saving mode of a printer, scanner, fax machine, copier, document storage device, and/or other such device having a power saving mode.

BACKGROUND

Printers, scanners, fax machines, copiers, document storage devices, and/or other such devices often employ a power saving mode to conserve electrical power when not in active use. Among the many examples of devices that may employ such a power saving mode are multifunction peripherals (MFPs) in which printer functionality may be combined with functionality or functionalities of one or more other devices that might include image scanner, facsimile machine, copy machine, and/or document storage device.

Printers and other such devices may have long warmup times and high power consumption due to presence of heaters, fans, motors, and/or other such electrical components. Depending on the technology employed, time may be required not only for warmup of electrical components but also to allow for changes in physical or chemical state, e.g., melting or deaeration of ink. Depending on the device, time may also be required for any of various activities which may include checking of media trays for presence of paper or other media, movement of rollers and/or other components at paper feed mechanisms to ascertain paper path status and/or attempt to correct paper jams, storage and/or retrieval of data, color calibration, warming up of ink and/or printhead, checking of ink level, any of various maintenance operations, and so forth.

To conserve electrical power when such a device is not in active use, control may be carried out so as to cause such a device to automatically enter a power saving mode or sleep state after a preset period of inactivity (inactivity timeout) has elapsed. At a later time, e.g., when printing, scanning, faxing, copying, document storage, and/or the like is to be carried out, activation of a front panel or other such user interface at the device or receipt of a print job or other such data stream or file by the device might serve as trigger event(s) to wake the device from its power saving mode.

While existence of such a power saving mode permits electrical power to be conserved when the device is not in use, and may also provide other benefits such as increased longevity of hardware components or consumables and reduced production of ambient heat, for example, the wait time that a user must endure before the device is ready to use can be inconvenient in certain situations.

A remote user at a physically distant location from such a device can be at a particular disadvantage with respect to this wait time as compared with a local user who is physically near the device. Whereas a local user who is physically near such a printer or other such device can often audibly or visually ascertain whether the device is ready for use, and might often be able to physically access the front panel on the device to wake the device, change the inactivity timeout setting, or otherwise alter the sleep mode behavior of the device, a remote user not so conveniently located near the device is generally more at the mercy of settings which may be beyond the control of the remote user.

The local user, who being close to the device is in any event less inconvenienced by a device not yet ready for use because the local user can more easily return to his or her desk and do other work while waiting for the device to warm up, will therefore generally be more capable of monitoring and/or altering device sleep/wake behavior and more capable of working around device delays, than the remote user who typically has fewer options in terms of monitoring and/or altering of device sleep/wake behavior and for whom it may not be such an easy matter to return to his or her desk, only to have to return again to the device at a later time, upon finding that such a device is not yet ready for use.

Although power conservation is a laudable goal, there are therefore circumstances in which speed, and reliability in the sense of knowing that a device will be up and running as soon as possible (or at some arbitrarily settable future time) and will not suddenly revert to power saving mode at an inopportune moment, are desirable. For example, in a corporate setting where printouts, copies, or the like are required for an important meeting to take place at a time certain, or when there is some other time-critical aspect to a print job or other operation that is to be carried out at a printer or other such device, it would be desirable if especially a user at a remote location who is physically distant from such a device had a way to reliably override the power saving mode of that device.

There is a therefore a need for especially a remote user to be able to override power saving mode at a device for fast and/or reliable use of the device at a time certain.

Whereas power saving mode tends to wrest control from the user, automating device sleep/wake behavior in the interest of energy conservation, a remote override capability that would empower especially a remote user by giving that user the ability to directly and/or preemptively instruct a device when to wake up from power saving mode and when to return thereto, without fear that this override instruction might be ignored or modified due to unwelcome operation of the device's power saving mode control, is desired.

On the other hand, so as not to permanently defeat the purpose of power saving mode, it is also desirable that such a remote override capability not permanently override power saving mode but instead cause the device to be returned to its standard or default power saving mode behavior following an override period of suitable duration.

In some cases it may also be desirable to allow certain aspects of standard or default power saving mode behavior of a device to be permanently altered as a result of such remote override, so as to give a remote user who is unable to physically access the front panel of a device a way to adjust not only parameter(s) which may be applicable to period(s) during which power saving mode is overridden but also parameter(s) which may be applicable following return of the device to its standard or default power saving mode behavior.

SUMMARY OF INVENTION

A remote device in accordance with an embodiment of the present invention may include a remote device computer. The remote device computer may have a remote device processor and a remote device communication interface.

The remote device may further include an outgoing override signal handler. The outgoing override signal handler may be capable of sending an override signal by way of the remote device communication interface.

The outgoing override signal handler may be capable of creating the override signal.

The remote device computer may have a remote device computer user interface. The outgoing override signal handler may create the override signal based on at least one parameter input by a user by way of the remote device computer user interface.

The override signal sent by the outgoing override signal handler may be a previously stored override signal. The previously stored override signal may be automatically sent to the local device by the outgoing override signal handler when a printer driver is accessed by a user at the remote device.

A local device in accordance with an embodiment of the present invention may include a local device computer. The local device computer may have a local device processor and a local device communication interface The local device may further include an incoming override signal handler. The incoming override signal handler may be capable of receiving the override signal by way of the local device communication interface.

The override signal may be capable of causing override of a power saving mode at the local device.

In one embodiment, the incoming override signal handler may override the power saving mode of the local device substantially immediately upon receipt of the override signal by the local device.

In another embodiment, the incoming override signal handler may initiate the override of the power saving mode of the local device at a time following receipt of the override signal by the local device. In some embodiments, the override initiation time may be determined from content of the override signal.

In some embodiments, the incoming override signal handler may cause the power saving mode of the local device to be overridden for a finite duration. In some embodiments, the finite duration may be determined from content of the override signal.

In some embodiments, the incoming override signal handler may cause an inactivity timeout governing operation of the power saving mode at the local device to be altered. In some embodiments, an amount by which the inactivity timeout is altered may be determined based on content of the override signal.

In one embodiment, the alteration of the inactivity timeout by the incoming override signal handler may cause the inactivity timeout to be shorter following the alteration than it was before the alteration.

In another embodiment, the alteration of the inactivity timeout by the incoming override signal handler may cause the inactivity timeout to be longer following the alteration than it was before the alteration.

In some embodiments, the local device may further comprise a power saving mode controller. In such an embodiment, an inactivity timeout, expiration of which when there is no activity at the local device might serve as trigger for the power saving mode controller to put the local device into the power saving mode, may be altered by the incoming override signal handler following receipt of the override signal by the local device.

In some embodiments, following the overriding of the power saving mode for the finite duration, the local device might be made to return to the power saving mode that existed prior to the overriding of the power saving mode.

In some embodiments, following conclusion of the overriding of the power saving mode, the inactivity timeout might not be returned to what it was before the alteration but might continue to be what it was after the alteration.

In some embodiments, the local device may comprise a printer.

In some embodiments, the local device might be a multifunction peripheral that may include functionality of at least one species selected from among the group consisting of image scanner, facsimile machine, copy machine, and document storage device.

In some embodiments, the override signal received by the incoming override signal handler may be a preemptor job capable of causing the overriding of the power saving mode at the local device.

In some embodiments, an imaging unit at the local device may be capable of causing the overriding of the power saving mode upon execution of the preemptor job.

In an embodiment in which the preemptor job causes the overriding of the power saving mode, the preemptor job that causes the overriding of the power saving mode might be executed by a job layer at the local device.

In an embodiment in which the preemptor job causes the overriding of the power saving mode, the preemptor job that causes the overriding of the power saving mode might be executed by a raster image processor at the local device.

In some embodiments, the override signal received by the incoming override signal handler might be an override command capable of causing the overriding of the power saving mode at the local device.

In an embodiment in which an override command causes the overriding of the power saving mode, the override command that causes the overriding of the power saving mode might be contained in at least one network packet routed to the local device by way of the communication interface.

In some embodiments, the local device might have an imaging unit that may perform at least one operation selected from among the group consisting of conversion of print data to bitmap, printing of print data on print media, and capture of an image from an original.

A remote override system in accordance with an embodiment of the present invention may comprise a remote device and a local device as described above.

A remote override method in accordance with an embodiment of the present invention may comprise receiving of an override signal by an incoming override signal handler at a local device.

The remote override method may further comprise causing override of a power saving mode at the local device.

In some embodiments, the overriding of the power saving mode may be carried out in correspondence to content of the override signal.

As described above, some embodiments of the present invention may make it possible for a remote user to override power saving mode for fast and/or reliable printing or other such use at a time certain of a local device having a power saving mode.

Because in some embodiments such override of power saving mode may be carried out by way of an override signal sent from the remote device that may be independent of any print job or other such communication with, or activity occurring at, the local device, this may improve speed and/or reliability with which override is carried out.

Because in some embodiments such override of power saving mode may be carried out by way of an override signal sent from the remote device that may bypass communication and/or activity occurring at the local device so as to directly and/or immediately override the power saving mode at the local device, this may improve speed and/or reliability with which override is carried out.

And because in some embodiments such override of power saving mode at the local device may have a finite duration, following which the local device may be returned substantially to its standard or default power saving mode behavior, this may make it possible in such an embodiment to temporarily override power saving mode without necessarily permanently defeating the overall purpose of power saving mode.

By in some embodiments allowing the inactivity timeout and/or other aspect(s) of standard or default power saving mode behavior at the local device to be permanently altered as a result of remote override, this may make it possible in such an embodiment to give a remote user who is unable to physically access the front panel of the local device a way to adjust not only parameter(s) applicable during override but also parameter(s) applicable following return of the local device to its standard or default power saving mode behavior.

Other embodiments, systems, methods, and features, and advantages of the present invention will be apparent to one with skill in the art upon examination of the following drawings and detailed description. It is intended that all such additional systems, methods, features, and advantages be included within this description, be within the scope of the present invention, and be protected by the accompanying claims.

BRIEF DESCRIPTION OF THE DRAWINGS

Many aspects of the invention can be better understood with reference to the following drawings. The components in the drawings are not necessarily to scale, emphasis instead being placed upon clearly illustrating the principles of the present invention. In the drawings, like reference numerals designate corresponding parts throughout the several views.

DETAILED DESCRIPTION

Methods, systems, and devices for remote override of power saving mode at printers, scanners, fax machines, copiers, document storage devices, and/or other such devices having power saving mode(s) in accordance with embodiments of the present invention are described in detail below with reference to the drawings. Although the functions described with reference to the functional block diagrams included among the attached drawings are shown for convenience as separate functional blocks, the function of any one or more blocks may be incorporated in or integrated with the function of any one or more other blocks.

Figure 1:
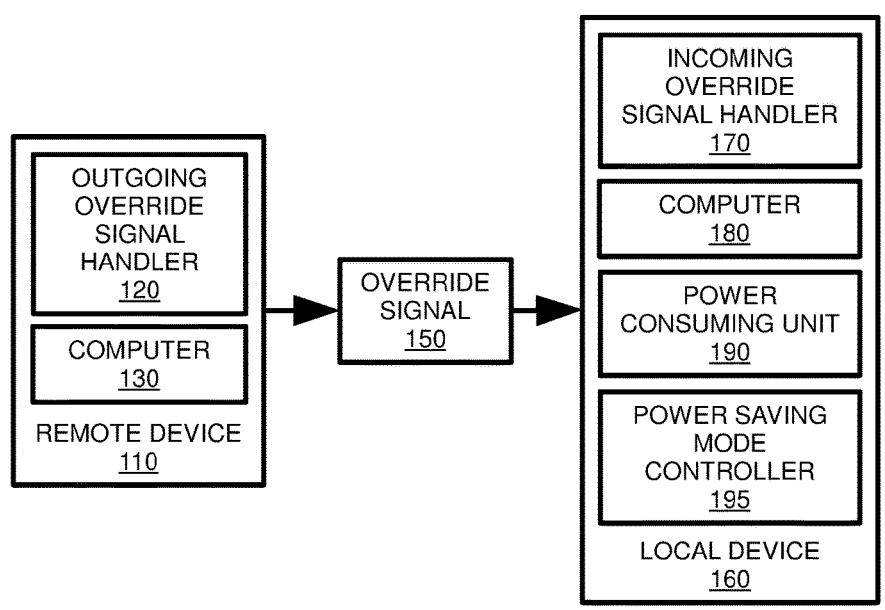
FIG. 1 is a functional block diagram of a remote override system 100 in which remote device 110 sends override signal 150 to local device 160 to cause remote override of power saving mode at local device 160 in accordance with an embodiment of the present invention.

FIG. 1 is a functional block diagram of a system 100 for remote override of the power saving mode at a local device 160 in accordance with an embodiment of the present invention. Remote override system 100 in the embodiment shown at FIG. 1 comprises remote device 110 and local device 160. In remote override system 100 shown at FIG. 1, remote device 110 is able to send override signal 150 to local device 160 to cause remote override of power saving mode at local device 160.

In some embodiments, local device 160 may be a printer, scanner, fax machine, copier, document storage device, or any other such device having a power saving mode. In some embodiments, local device 160 may be a multifunction peripheral (MFP) in which printer functionality, for example, is combined with functionality or functionalities of one or more other devices that might include image scanner, facsimile machine, copy machine, and/or document storage device. Where local device 160 is an MFP having a document storage device, this may be useful for storage of print job(s) until such time as user(s) are ready to print the print job(s).

In some embodiments, local device 160 might take the form of a print server or RIP (raster image processor) server or other such computer server or server terminal, computer client or client terminal, desktop computer or other such personal computer, web-browser-equipped television or other such web browsing device, or any other suitable computer-equipped device capable of communicative connection with remote device 110.

In some embodiments, one or more of the functionalities of local device 160 may be incorporated into a desktop application, mobile application, printer driver, web browser, terminal communication program, communication applet or utility, and/or any other suitable hardware, firmware, and/or software, or any combination of hardware, firmware, and/or software capable of receiving override signal 150 and having a power saving mode.

Figure 2:
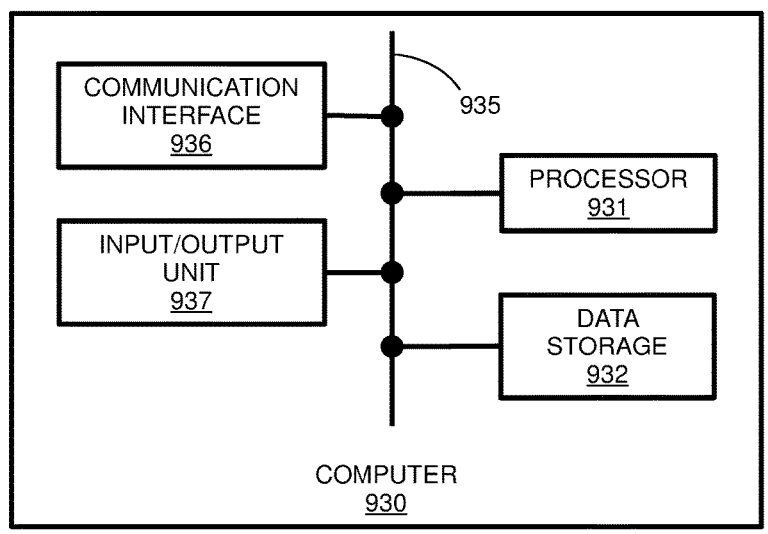
FIG. 2 is a functional block diagram of a computer 930 such as may be employed as computer 130 of remote device 110 and/or as computer 180 of local device 160 in remote override system 100 shown in FIG. 1.

FIG. 2 is a functional block diagram of a computer 930. Computer 930 shown in FIG. 2 may include processor 931, data storage 932, communication interface 936, and input/output unit 937, all of which may be mutually coupled by way of bus 935 or similar mechanism.

Processor 931 may include one or more central processing units (CPUs), such as one or more general purpose processors and/or one or more dedicated processors (e.g., application specific integrated circuits also known as ASICs or digital signal processors also known as DSPs, etc.).

Data storage 932 may include volatile and/or non-volatile data storage and can be integrated in whole or in part with processor 931. Data storage 932 may store program instructions, executable by processor 931, and data that are manipulated by these instructions to carry out the various methods, processes, or functions described herein. Each of the various methods, processes, and functions described herein can be defined by hardware, firmware, and/or software, or any combination of hardware, firmware, and/or software. Data storage 932 may include a tangible non-transitory computer-readable medium having stored thereon program instructions that upon execution by processor 931 cause computer 930 to carry out any of the methods, processes, or functions described herein. In some embodiments, data storage 932 may be capable of storing other data in addition to such program instructions.

Communication interface 936 may be any hardware, firmware, and/or software component, or any combination of hardware, firmware, and/or software components, capable of performing the communication interface functions described herein. Communication interface 936 may engage in wired and/or wireless communication with one or more other computers. Communication interface 936 could take the form of a modem, Ethernet, Wi-Fi, Universal Serial Bus (USB), Bluetooth interface, and/or any other suitable type or types of communication interface.

Input/output unit 937 may include a user interface that facilitates user interaction with computer 930 to configure and/or control operation of processor 931 and/or provide output based on operations performed by processor 931. Input/output unit 937 may comprise a keyboard, mouse, touchpad, touchscreen, microphone, and/or any other device capable of receiving input from a user. Input/output function 937 may comprise a display, printer, light emitting diode (LED), speaker, and/or any other device capable of providing output discernible to a user. Where computer 930 supports remote access from another device by way of communication interface 936, the functionality of input/output unit 937 might be carried out by components at the other device.

In some embodiments, input/output unit 937 and/or data storage 932 may include nonremovable volatile and/or non-volatile storage. In some embodiments, input/output unit 937 and/or data storage 932 may include removable storage interface(s) permitting communicative connection to removable volatile and/or nonvolatile storage. Such nonremovable and/or removable volatile and/or nonvolatile storage may include random access memory (RAM), read only memory (ROM), flash memory, solid state drive, tape drive, flexible disk, floppy disk, hard disk, Secure Digital (SD) card, xD picture card, compact flash, USB flash, compact disk (CD), digital versatile disk (DVD), and/or other such magnetic and/or optical disk and/or memory and/or other such suitable storage device, or any combination hereof.

Bus 935 may take the form of an electrical system bus or other such local interface that allows for internal communication among processor 931, data storage 932, communication interface 936, and input/output unit 937.

So long as it is able to perform the various methods, processes, or functions described herein, computer 930 need not have all of the components shown at FIG. 2. For example, in some embodiments, input/output unit 937 may be omitted where there is no particular need to interact with a user and/or peripheral equipment. In some embodiments, computer 930 may have components in addition to and/or other than those shown at FIG. 2. Although shown for convenience within one block in FIG. 2, there is no objection to employment of a distributed system in which any of the various functional blocks making up computer 930 are at disparate locations, in which case bus 935 may be supplemented by or replaced with multiple communication interfaces 936 to facilitate communicative connection between or among the various disparate components.

A computer similar to computer 930 shown in FIG. 2 may be employed as computer 130 of remote device 110 in the embodiment shown at FIG. 1, in which case computer 130 at remote device 110 in the embodiment shown at FIG. 1 might have processor 131, data storage 132, communication interface 136, input/output unit 137, and bus 135.

A computer similar to computer 930 shown in FIG. 2 may be employed as computer 180 of local device 160 in the embodiment shown at FIG. 1, in which case computer 180 at local device 160 in the embodiment shown at FIG. 1 might have processor 181, data storage 182, communication interface 186, input/output unit 187, and bus 185.

Returning to FIG. 1, remote device 110 might, for example, take the form of a smartphone or other such mobile telephone, computer client or client terminal, computer server or server terminal, personal digital assistant (PDA), notebook computer, laptop computer, tablet computer, wearable computer, desktop computer or other such personal computer, web-browser-equipped television or other such web browsing device, or any other suitable computer-equipped device capable of communicative connection with local device 160.

"Remote" as used herein means at a location other than the immediate physical location of local device 160, from which remote location a user would typically more easily employ communication interface 136 of computer 130 present at that remote device 110 rather than the front panel or other such user interface which may be physically located at or on local device 160 to affect operation of local device 160. But note that even where a user is located near local device 160, the user may find it more convenient to interact with the local device 160 remotely rather than via the front panel or other such user interface of local device 160, or where local device 160 has no such user interface a user regardless of proximity to local device 160 might have no choice but to interact with local device 160 remotely in the sense of communicating therewith by way of communication interface 136 of computer 130 at remote device 110, in which case embodiments of the present invention, protected by the accompanying claims, might advantageously be employed to alter the power saving mode behavior of the local device 160.

"Local" is used herein to refer to the location of a device having a power saving mode that is to be overridden in accordance with an embodiment of the present invention.

Remote device 110 may include outgoing override signal handler 120 and computer 130.

Override signal handler 120 may be capable of creating an override signal 150 and may be capable of sending this override signal 150 to local device 160.

In some embodiments, outgoing override signal handler 120 may have functionality for automatic creation of an override signal 150 which when sent to local device 160 by way of communication interface 136 of computer 130 is capable of causing override of power saving mode at local device 160.

In some embodiments, outgoing override signal handler 120 may have functionality for causing a user interface at input/output unit 137 of computer 130 to prompt and/or accept input from a user, and may have functionality for creating an override signal 150 based on input received from the user.

Communication interface 136 of computer 130 at remote device 110 is at least capable of sending override signal 150 to local device 160 and is preferably also capable of receiving various communications from local device 160.

With continued reference to FIG. 1, local device 160 may be a printer, scanner, fax machine, copier, document storage device, or any other such device having a power saving mode. In an embodiment in which local device 160 is a printer, for example, such a printer might take the form of a black-and-white (or monochrome) printer or color printer, or might take the form of a multifunction peripheral (MFP) in which printer functionality is combined with functionality or functionalities of one or more other devices that might include image scanner, facsimile machine, copy machine, and/or document storage device.

In some embodiments, local device 160 might take the form of a print server or RIP (raster image processor) server or other such computer server or server terminal, computer client or client terminal, desktop computer or other such personal computer, web-browser-equipped television or other such web browsing device, or any other suitable computer-equipped device capable of communicative connection with remote device 110. In some embodiments, one or more of the functionalities of local device 160 may be incorporated into a desktop application, mobile application, printer driver, web browser, terminal communication program, communication applet or utility, and/or any other suitable hardware, firmware, and/or software, or any combination of hardware, firmware, and/or software capable of receiving override signal 150 and having a power saving mode.

Local device 160 may include incoming override signal handler 170, computer 180, power consuming unit 190, and power saving mode controller 195.

Power consuming unit 190 of local device 160 may include any of various component(s) that consume electrical power. In some embodiments, power consuming unit 190 may include any of various heaters, fans, motors, and/or other such electrical components such as those which may be required for any of various activities that may include checking of media trays for presence of paper or other media, movement of rollers and/or other components at paper feed mechanisms to ascertain paper path status and/or attempt to correct paper jams, color calibration, storage and/or retrieval of data, warming up of ink and/or printhead, checking of ink level, any of various maintenance operations, and so forth.

Where local device 160 is or includes a printer, for example, power consuming unit 190 may be an imaging unit at such printer that may include printhead(s) or similar device(s) (referred to collectively herein as "printhead") for applying ink or other such marking material (referred to collectively herein as "ink") to paper or other such print media (referred to collectively herein as "print media").

In such an embodiment, power consuming unit 190 of local device 160 might alternatively or additionally include a media feed mechanism for supply and transport of print media on which printing by such a printhead may be carried out. Depending on the technology employed, such an imaging unit might include any of a variety of electrical and/or electromechanical components which may include any of a number of heaters, fans, solenoids, electrical transformers, driver circuitry, and so forth. Where local device 160 is or includes a printer, such an imaging unit might, for example, employ a laser, inkjet, and/or dot-matrix printhead to carry out printing.

Where local device 160 is or includes a printer, power consuming unit 190 at local device 160 may be an imaging unit that includes job layer functionality for control and/or routing of print jobs to be printed at local device 160. In some embodiments, local device 160 may include page description language (PDL) interpreter(s) or other such functionality for interpreting and carrying out print instructions. In some embodiments, local device 160 may include a raster image processor (RIP) or other such functionality for converting print data to bitmap or other format suitable for direct input to printhead drivers. In some embodiments, data to be printed may be made available to power consuming unit 190 of local device 160 in bitmap form by a graphical device interface (GDI) and/or by a separate RIP, for example.

Where local device 160 is or includes a printer, power consuming unit 190 may be configured to carry out printing of print data in the form of print jobs received via communication interface 186 of computer 180 at local device 160. In some embodiments, print data might be received at local device 160 via communication interface 186 and/or data storage 182 of computer 180 at local device 160 or via a USB thumb drive or other such removable storage device which might, for example, be inserted into a removable storage interface at data storage 182 or input/output unit 187 of computer 180 at local device 160.

Alternatively or additionally, where local device 160 is or includes a scanner, for example, power consuming unit 190 may be an imaging unit that may include optical detector(s) for capture of images from hard copy originals. Depending on the technology employed, such an imaging unit might include any of a variety of electrical and/or electromechanical components which may include any of a number of heaters, fans, motors, solenoids, electrical transformers, driver circuitry, and so forth. Where local device 160 is or includes a printer, such an imaging unit might, for example, employ a laser, inkjet, and/or dot-matrix printhead to carry out printing. In such an embodiment, power consuming unit 190 of local device 160 might alternatively or additionally include a media feed mechanism for supply and transport of such hard copy originals.

Thus, depending on context, the term "imaging" as used herein may mean rendering of print data in hard copy or bitmap form as may occur during or preparatory to printing, and/or may mean capture of images as may occur during scanning. In this context, the term "image" is not necessarily intended to mean images as exclusive of text or to imply limitation to any particular format or the like, but is merely intended to indicate any visually cognizable or reproducible representation.

As used herein, "print data" may be any data that is in or may be converted into a format capable of being printed by a printer. In some embodiments, print data may be the content of print job(s), data based on which print job(s) may be created, and/or data that may result from RIPping or similar processing of print job(s).

Power saving mode controller 195 at local device 160 may be capable of causing local device 160 to enter a sleep state or other such power saving mode during periods of inactivity at local device 160. In some embodiments, power saving mode controller 195 may include functionality for reducing power consumption by maximizing or optimizing time spent in power saving mode by local device 160. In some embodiments, power saving mode controller 195 may be capable of preventing local device 160 from entering power saving mode and/or causing local device 160 to emerge (wake) from power saving mode in correspondence to operation of, e.g., direction or control of power saving mode controller 195 by, incoming override signal handler 170.

As used herein, "power saving mode" refers to a state of reduced electrical power consumption at local device 160, which might typically be entered due to operation of power saving mode controller 195 following a period of inactivity at local device 160. In some embodiments, power saving mode might reduce or turn off electrical power to all or any portion of the components at power consuming unit 190. In a preferred embodiment, power saving mode leaves undisturbed. i.e., electrical power at least sufficient for basic operation continues to flow to, at least the basic functionality of communication interface 186 of computer 180 at local device 160 so that incoming override signal handler 170 remains capable of receiving any override signal 150 that may be sent thereto from remote device 110. In a preferred embodiment, functional blocks or components thereof that are required for carrying out remote override functionality, e.g., incoming override signal handler 170 and/or computer 180, might similarly remain undisturbed by power saving mode; or, if made to enter a sleep state during power saving mode, might be capable of being awakened upon detection of an override signal 150 at communication interface 186 of computer 180 at local device 160.

Incoming override signal handler 170 may be capable of receiving an override signal 150 from remote device 110 and may be capable of overriding power saving mode at local device 160 in correspondence to that override signal 150.

As used herein, "overriding power saving mode" means preventing local device 160 from entering power saving mode and/or causing local device 160 to emerge (wake) from power saving mode. In some embodiments, prevention of local device 160 from entering power saving mode and/or causing of local device 160 to emerge (wake) from power saving mode may be carried out by way of power saving mode controller 195. In some embodiments, prevention of local device 160 from entering power saving mode and/or causing of local device 160 to emerge (wake) from power saving mode may be carried out directly, e.g., as a result of bypass circuitry, by incoming override signal handler 170 without intervention of power saving mode controller 195.

As distinct from embodiments in which it may not be possible for a user at remote device 110 to directly, preemptively, definitively, or reliably override power saving mode at local device 160, incoming override signal handler 170 in at least some embodiments is capable of directly, preemptively, definitively, and/or reliably overriding power saving mode at local device 160.

As distinct from embodiments in which power saving mode controller 195 may not completely cede control of power saving mode at local device 160 to incoming override signal handler 170, incoming override signal handler 170 in at least some embodiments may be capable of exerting preemptive and/or precedential control over power saving mode controller 195, or may be capable of directly overriding power saving mode at local device 160 without intervention of power saving mode controller 195, or may be otherwise capable of directly, preemptively, definitively, and/or reliably overriding power saving mode at local device 160.

For example, in one embodiment, incoming override signal handler 170 may control or direct power saving mode controller 195 in such fashion as to cause local device 160 to emerge (wake) from power saving mode and/or prevent local device 160 from entering power saving mode.

Or in another embodiment, incoming override signal handler 170 may be capable of bypassing power saving mode controller 195 by causing electrical power to be supplied to power consuming unit 190 and/or other component(s) of local device 160, independently of any action of power saving mode controller 195, to cause local device 160 to emerge (wake) from power saving mode and/or prevent local device 160 from entering power saving mode.

Communication interface 186 of computer 180 at local device 160 is at least capable of receiving override signal 150 from remote device 110 and is preferably also capable of sending various communications to remote device 110.

At remote override system 100, remote device 110 is communicatively connected to local device 160 by way of communication interface 136 of computer 130 at remote device 110 and by way of communication interface 186 of computer 180 at local device 160. Communicative connection between remote device 110 and local device 160, preferably allowing bidirectional communication between remote device 110 and local device 160 but at least allowing remote device 110 to send override signal 150 to local device 160, might be carried out in wired and/or wireless fashion.

Wired communication might, for example, take the form of a serial bus, parallel bus, USB connection, IEEE 1394 connection, and/or any other suitable wired communication. Wireless communication might, for example, take the form of a Bluetooth, IEEE 802.15.4 (ZigBee), ANT, Infrared Data Association (IrDA), near field communication (NFC), IEEE 802.11, Wi-Fi, and/or any other suitable wireless connection. Note that there is no objection to combination of wired and wireless communication for communicative connection between remote device 110 and local device 160. Note further that communicative connection between remote device 110 and local device 160 need not take place directly via a single communication line or network, it being possible for communicative connection between remote device 110 and local device 160 to be carried out by way of any number of communication lines and/or networks which may intervene therebetween.

Figure 3:
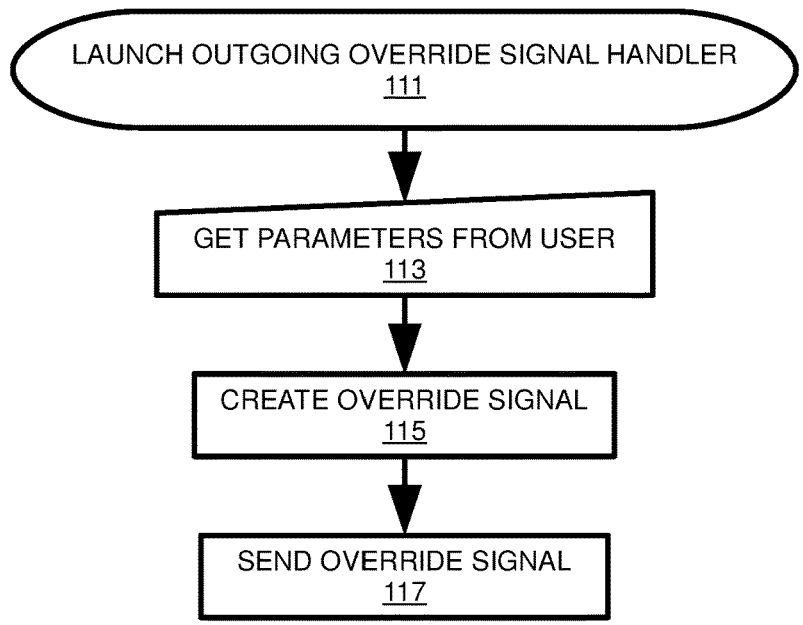
FIG. 3 is a flowchart showing flow of processing that might take place at remote device 110 in remote override system 100 shown in FIG. 1.

Referring to FIG. 3, flow of processing such as might take place at remote device 110 in remote override system 100 shown in FIG. 1 will now be described.

At remote override system 100 in accordance with the embodiment shown at FIG. 1, a user at remote device 110 may override the power saving mode of local device 160 by causing an override signal 150 to be sent from remote device 110 to local device 160.

At step 111 in the flowchart shown in FIG. 3, a user at a remote device 110 might operate a touchscreen, mouse, keyboard, and/or other such input device of a user interface at input/output unit 137 of computer 130 at remote device 110 to launch outgoing override signal handler 120.

The functionality of outgoing override signal handler 120 may be incorporated into a desktop application, mobile application, printer driver, web browser, terminal communication program, communication applet or utility, and/or any other suitable hardware, firmware, and/or software, or any combination of hardware, firmware, and/or software capable of creating and/or sending override signal 150 to local device 160.

In some embodiments, a standard or default override signal 150 might have been previously stored at remote device 110, in which case step 113 might be omitted where there is no need to get parameters for creation of override signal 150 from the user.

In some embodiments, a preemptor job (described below), override command (described below), and/or other such instruction(s) for causing override of power saving mode at local device 160 may be previously stored at local device 160 or is otherwise retrievable by incoming override signal handler 170 of local device 160. In such an embodiment, receipt of override signal 150 by local device 160 might serve as trigger for retrieval by incoming override signal handler 170 of such preemptor job, override command, or the like, which might thereafter be used instead of or in addition to override signal 150 to cause override of power saving mode at local device 160. Especially where override signal 150 is of smaller data size than such preemptor job, override command, or the like, this may improve speed and/or reliability with which override is carried out.

In some embodiments, override signal 150 might be sent automatically from remote device 110 when, for example, a printer driver or communication applet is launched at remote device 110, in which case the functionality of outgoing override signal handler 120 might be carried out by the printer driver or communication applet, for example.

In some embodiments, the functionality of outgoing override signal handler 120 may be carried out by a web browser executed by computer 130 of remote device 110 to access a web page or control panel settings page hosted by local device 160. In some embodiments, the functionality of outgoing override signal handler 120 may be carried out by a desktop application, control panel, or similar program at remote device 110.

At step 113 in the flowchart shown in FIG. 3, outgoing override signal handler 120 might, by way of a display or other such output device of a user interface at input/output unit 137 of computer 130 at remote device 110, prompt the user at remote device 110 to enter any parameters which may in some embodiments be necessary for creation of override signal 150. In response to being prompted in this fashion, the user at remote device 110 might operate a touchscreen, mouse, keyboard, and/or other such input device of a user interface at input/output unit 137 of computer 130 at remote device 110 to cause any of various parameters necessary for creation of override signal 150 to be input to outgoing override signal handler 120.

For example, in embodiments in which it is possible to cause remote override of power saving mode at local device 160 to occur at a user-settable time ("remote override initiation time") and/or for a user-settable duration ("remote override duration"), a display at a user interface at input/output unit 137 of computer 130 at remote device 110 might present a pulldown menu or an input field permitting selection and/or entry of such parameters by the user. In a preferred embodiment, the remote override duration is finite, i.e., temporary and not permanent. In some embodiments, a user interface at input/output unit 137 of computer 130 at remote device 110 might permit the user to freely enter any desired remote override initiation date and/or time, and/or any desired remote override duration. In some embodiments, a user interface at input/output unit 137 of computer 130 at remote device 110 might permit the user to select a desired remote override initiation date and/or time from a calendar-like interface or a pulldown list in which "today" and/or "now" is the default value, with future days and/or times being listed in increments of days and/or 10-minute intervals, respectively, for example. In some embodiments, a user interface at input/output unit 137 of computer 130 at remote device 110 might permit the user to select a desired remote override duration from a pulldown list in which selectable possible durations from 10 minutes to 24 hours are listed in increments of 10-minute intervals, for example. In some embodiments in which the inactivity timeout governing operation of power saving mode at local device 160 may be made to have an altered value during and in some embodiments optionally also after remote override, a user interface at input/output unit 137 of computer 130 at remote device 110 might permit the user to select a desired inactivity timeout from a pulldown list in which selectable possible inactivity timeouts are listed from 10 minutes to 24 hours in increments of 10-minute intervals, for example.

Or in some embodiments, a user might cause immediate initiation of remote override to occur for a standard or default duration, and/or with a standard or default alteration of the inactivity timeout governing operation of power saving mode, by merely clicking on a button containing the words "Send remote override signal" or "Prepare engine" from within an Advanced tab of a Printing Preferences menu displayed by a printer driver when the user right-clicks on a context menu at a printer and/or printer queue menu item or icon, for example, in which case the clicking on the button by the user might serve as parameter(s) input by the user for creation of override signal 150, or alternatively step 113 might be considered to be omitted and the clicking of the button by the user might be considered to constitute the launching of the outgoing override signal handler 120 at step 111.

Or in an embodiment in which a default or standard override signal 150 is sent automatically when a user opens a print settings dialog, for example, the opening of the print settings dialog by the user might serve as parameter(s) input by the user for creation of override signal 150, or alternatively step 113 might be considered to be omitted and the opening of the print settings dialog by the user might be considered to constitute the launching of the outgoing override signal handler 120 at step 111.

Note that automatic sending of an override signal 150 in response to opening by the user of a print settings dialog, for example, may be especially effective with large print jobs, since this may permit the time spent in spooling and/or RIPping the print data to be efficiently utilized for giving the local device 160 a chance to warm up so that local device 160 is ready to print when the bitmapped print data is ready to be sent to the printhead drivers, for example. In this regard, as override signal 150 might typically be much smaller in terms of data size than the size of a print job which may be sent from remote device 110 to local device 160, sending such an override signal 150 to local device 160 before sending the print job itself may in many cases improve overall efficiency.

Such effect may be alternatively or additionally achieved where a preemptor job, override command, and/or other such instruction(s) for causing override of power saving mode at local device 160 has been previously stored at local device 160 or is otherwise retrievable by incoming override signal handler 170 of local device 160. In such an embodiment, receipt of override signal 150 by local device 160 might serve as trigger for retrieval by incoming override signal handler 170 of such preemptor job, override command, or the like, which might thereafter be used instead of or in addition to override signal 150 to cause override of power saving mode at local device 160. Especially where override signal 150 is of smaller data size than such preemptor job, override command, or the like, this may improve speed and/or reliability with which override is carried out.

At step 115 in the flowchart shown in FIG. 3, outgoing override signal handler 120 may create override signal 150 based on parameter(s) input by the user at step 113. As used herein, the term "parameters" may refer to date(s) and/or time(s) entered by the user for initiation and/or duration of remote override and/or alteration of inactivity timeout, for example, or may refer to standard or default values for automatic creation of override signal 150 in response to clicking of a button or menu item or opening of a print settings dialog by a user, for example.

Where standard or default values are employed for automatic creation of override signal 150, such standard or default values may in some embodiments be previously stored at remote device 110 or otherwise retrievable by outgoing override signal handler 120 prior to sending of the override signal 150 so that the override signal 150 which is created by remote device 110 and sent to local device 160 can be made to contain such standard or default values, or in some embodiments the override signal 150 which is sent to local device 160 might not contain such standard or default values, such standard or default values being instead previously stored at local device 160 or otherwise retrievable by incoming override signal handler 170 following receipt of the override signal 150.

In some embodiments, the parameters entered by the user at step 113, or the parameters previously stored at remote device 110 or otherwise retrievable by outgoing override signal handler 120 prior to sending of the override signal 150, or previously stored at local device 160 or otherwise retrievable by incoming override signal handler 170 following receipt of the override signal 150, might include a parameter for alteration of the inactivity timeout governing operation of power saving mode at local device 160.

That is, in some embodiments, expiration of an inactivity timeout when there is no activity at local device 160 may serve as trigger for entry of local device 160 into power saving mode.

For example, in some embodiments, during normal operation, when power saving mode is not being overridden, expiration of an inactivity timeout when there is no activity at local device 160 may serve as trigger for power saving mode controller 195 to cause local device 160 to enter power saving mode.

For example, under standard or default behavior when power saving mode at local device 160 is not being overridden, the standard or default inactivity timeout employed by power saving mode controller 195 might cause local device 160 to enter power saving mode when there is no activity at local device 160 for a period of, for example, five minutes. And in an embodiment in which override signal 150 causes local device 160 to emerge (wake) from power saving mode without alteration of this inactivity timeout, following initiation of remote override by incoming override signal handler 170 the local device 160 might again enter power saving mode when no print job or other such data stream or file is received by local device 160 during the five-minute period following initiation of remote override.

However, a user at remote device 110 wishing to prevent local device 160 from entering or reentering power saving mode for a period longer than this default or standard inactivity timeout time, e.g., five minutes, may in some embodiments be able, e.g., at step 113 in the flowchart shown in FIG. 3, to enter and/or select an altered inactivity timeout to govern operation of power saving mode during remote override of power saving mode at local device 160. In embodiments in which such alteration of the inactivity timeout governing operation of power saving mode at local device 160 is carried out, the user may, e.g., at step 113 in the flowchart shown in FIG. 3, be able to designate an altered inactivity timeout for use during remote override that is shorter and/or longer than the standard or default inactivity timeout that would otherwise govern operation of power saving mode at local device 160. In some embodiments, this altered inactivity timeout might be entered automatically, without need for entry or designation thereof by the user at step 113 in the flowchart shown in FIG. 3, based on a previously stored value.

At step 117 in the flowchart shown in FIG. 3, the override signal 150 is sent to local device 160 by way of communication interface 136 of computer 130 at remote device 110.

Figure 4:
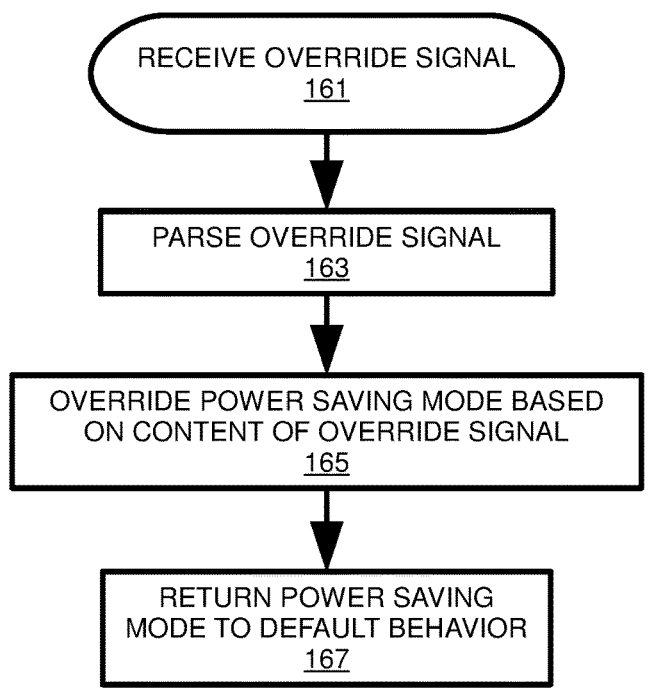
FIG. 4 is a flowchart showing flow of processing that might take place at local device 160 in remote override system 100 shown in FIG. 1.

Referring to FIG. 4, flow of processing such as might take place at local device 160 in remote override system 100 shown in FIG. 1 will now be described.

At step 161 in the flowchart shown in FIG. 4, an override signal 150 might be received from remote device 110 by way of communication interface 186 of computer 180 at local device 160.

Thereafter, at step 163 in the flowchart shown in FIG. 4, incoming override signal handler 170 may parse the override signal 150 received at step 161 to determine which, if any, parameter(s) are contained therein, and/or to determine which, if any, previously stored parameter(s) are to be retrieved from data storage 182 of computer 180 at local device 160 and/or other location(s) accessible by incoming override signal handler 170.

At this time, in an embodiment in which a preemptor job, override command, and/or other such instruction(s) for causing override of power saving mode at local device 160 has been previously stored at local device 160 or is otherwise retrievable by incoming override signal handler 170 of local device 160, receipt of override signal 150 by local device 160 might serve as trigger for retrieval by incoming override signal handler 170 of such preemptor job, override command, or the like, and such retrieved preemptor job, override command, or the like might thereafter be used instead of or in addition to override signal 150 to cause override of power saving mode at local device 160. In such an embodiment, where it is described below how overriding of power saving mode at local device 160 by incoming override signal handler 170 may be carried out in correspondence to receipt of override signal 150, this should be understood to include the situation where such retrieved preemptor job, override command, or the like has bee retrieved in correspondence to receipt of override signal 150 by local device 160 and is thereafter used instead of or in addition to override signal 150 to cause override of power saving mode at local device 160.

In one embodiment, where override signal 150 contains no parameter affecting remote override, and/or no parameter affecting remote override is to be retrieved by incoming override signal handler 170, mere recognition by incoming override signal handler 170 of the fact that an override signal 150 has been received may serve as the parsing of override signal 150 indicated at step 163, or alternatively step 163 might be considered to be omitted, in which case processing would proceed directly from step 161 to step 165. In such an embodiment, remote override of power saving mode might be carried out by employing standard or default values as the parameter(s) affecting remote override.

In an embodiment where parameter(s) affecting remote override are to be retrieved by incoming override signal handler 170, the parsing of override signal 150 indicated at step 163 may include retrieval by incoming override signal handler 170 of parameter(s) from data storage 182 of computer 180 at local device 160 and/or other location(s) accessible by incoming override signal handler 170.

In an embodiment where override signal 150 contains parameter(s) affecting remote override, and/or parameter(s) affecting remote override are retrieved by incoming override signal handler 170, the parsing of override signal 150 indicated at step 163 may include extraction and/or analysis of parameter(s) contained in override signal 150 and/or retrieved by incoming override signal handler 170 so that such parameter(s) are available to incoming override signal handler 170 for overriding of power saving mode at local device 160.

At step 165 in the flowchart shown in FIG. 4, incoming override signal handler 170 overrides power saving mode at local device 160. Overriding of power saving mode at local device 160 by incoming override signal handler 170 may be carried out in correspondence to receipt of override signal 150, at least in the sense that receipt of override signal 150 by local device 160 causes power saving mode to be overridden at local device 160. In some embodiments, overriding of power saving mode may be carried out in correspondence to receipt of override signal 150 in the sense that the manner in which power saving mode at local device 160 is overridden by incoming override signal handler 170 may differ depending on value(s) of parameter(s) which may be contained in override signal 150. In some embodiments, such parameter(s) may have been entered by the user at step 113 in the flowchart shown in FIG. 3. In some embodiments, such parameter(s) may have been automatically incorporated into override signal 150 by outgoing override signal handler 120 and/or by incoming override signal handler 170.

In some embodiments, this overriding of power saving mode may be carried out directly by incoming override signal handler 170 without intervention of power saving mode controller 195. For example, in some embodiments, incoming override signal handler 170 may be capable of bypassing power saving mode controller 195 to cause local device 160 to emerge (wake) from power saving mode and/or prevent local device 160 from entering power saving mode. For example, in some embodiments, incoming override signal handler 170 may be capable of causing electrical power to be supplied to power consuming unit 190 and/or other component(s) of local device 160 independently of any action of power saving mode controller 195.

In some embodiments, this overriding of power saving mode may be carried out by way of power saving mode controller 195. For example, in some embodiments, incoming override signal handler 170 may direct power saving mode controller 195 to cause local device 160 to emerge (wake) from power saving mode and/or prevent local device 160 from entering power saving mode.

Regardless of whether overriding of power saving mode by incoming override signal handler 170 takes place directly without intervention of power saving mode controller 195 or indirectly by way of power saving mode controller 195, incoming override signal handler 170 may in some embodiments be capable of overriding power saving mode so as to cause local device 160 to, immediately following receipt of override signal 150 by local device 160, emerge from and/or be prevented from entering or reentering power saving mode, or incoming override signal handler 170 may in other embodiments be capable of overriding power saving mode so as to cause local device 160 to, at a time certain following receipt of override signal 150 by local device 160, emerge from and/or be prevented from entering or reentering power saving mode. Where emergence from and/or prevention of entry into power saving mode does not take place immediately following receipt of override signal 150 by local device 160, the remote override initiation time may be determined based on parameter(s) contained in the override signal 150 and/or parameter(s) retrieved by incoming override signal handler 170 as parsed therefrom by incoming override signal handler 170 at step 163.

Regardless of whether overriding of power saving mode by incoming override signal handler 170 takes place directly without intervention of power saving mode controller 195 or indirectly by way of power saving mode controller 195, incoming override signal handler 170 may in some embodiments be capable of altering the inactivity timeout governing operation of power saving mode at local device 160. Where the inactivity timeout governing operation of power saving mode at local device 160 is altered by incoming override signal handler 170 during override of power saving mode at local device 160, the amount by which the inactivity timeout is altered may be determined based on parameter(s) contained in the override signal 150 and/or parameter(s) retrieved by incoming override signal handler 170 as parsed therefrom by incoming override signal handler 170 at step 163.

At step 167 in the flowchart shown in FIG. 4, at the conclusion of override of power saving mode at local device 160, incoming override signal handler 170 may cause power saving mode at local device 160 to return to its standard or default power saving mode behavior. That is, whereas incoming override signal handler 170 may in some embodiments have bypassed power saving mode controller 195 to cause local device 160 to emerge (wake) from power saving mode and/or prevent local device 160 from entering power saving mode, such bypassing of power saving mode controller 195 might be terminated at step 167 so as to return local device 160 to its standard or default power saving mode behavior. Or whereas incoming override signal handler 170 may in some embodiments have directed power saving mode controller 195 to cause local device 160 to emerge (wake) from power saving mode and/or prevent local device 160 from entering power saving mode, such direction of power saving mode controller 195 by incoming override signal handler 170 might be terminated at step 167 so as to return local device 160 to its standard or default power saving mode behavior.

In some embodiments, aspects of the standard or default power saving mode behavior of local device 160 may be altered following return of local device 160 to its otherwise standard or default power saving mode behavior at step 167 based on one or more parameter(s) entered by the user and/or retrieved by outgoing override signal handler 120 at step 113 in the flowchart shown in FIG. 3 and/or retrieved by incoming override signal handler 170 at step 163 in the flowchart shown in FIG. 4.

For example, in some embodiments, where an altered inactivity timeout has been employed during override of power saving mode at local device 160, the altered inactivity timeout may continue to govern operation of power saving mode at local device 160 following return of local device 160 to its otherwise standard or default power saving mode behavior at step 167 in the flowchart shown in FIG. 4. In such an embodiment, this might give a remote user ability to change the inactivity timeout governing operation of power saving mode at local device 160 even after local device 160 is returned to its otherwise standard or default power saving mode behavior at step 167.

Or in embodiments where it is perceived as undesirable for a remote user to be able to permanently change the inactivity timeout or other parameter(s) affecting operation of power saving mode at local device 160, local device 160 might, at step 167 in the flowchart shown in FIG. 4, be restored to exactly the same power saving mode behavior that it had prior to remote override.

Figure 5:
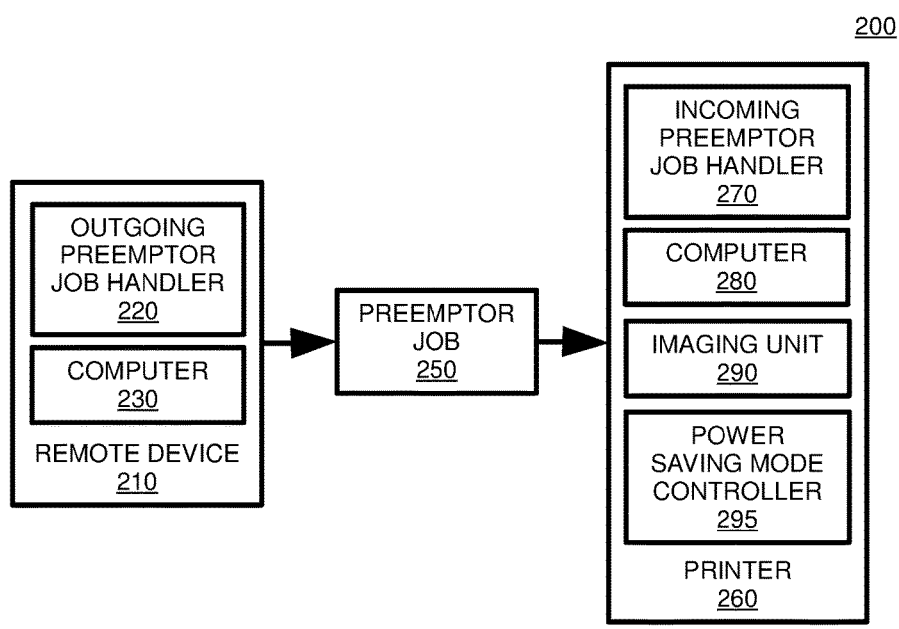
FIG. 5 is a functional block diagram of a remote override system 200 in which remote device 210 sends preemptor job 250 to printer 260 to cause remote override of power saving mode at printer 260 in accordance with an embodiment of the present invention.

FIG. 5 is a functional block diagram of a remote override system 200 in an embodiment in which the override signal 150 of remote override system 100 described with reference to FIG. 1 takes the form of a preemptor print job 250 which is sent from remote device 210 to printer 260 serving as local device 160. At remote override system 200 shown in FIG. 5, printer 260 has imaging unit 290 serving as power consuming unit 190.

Remote override system 200 shown in FIG. 5 being similar in many respects to remote override system 100 shown in FIG. 1, like parts have been given like reference numerals and description thereof will be omitted.

Although outgoing preemptor job handler 220 is for convenience shown in FIG. 5 as creating preemptor job 250 which is sent to and received by incoming preemptor job handler 270, in some embodiments creation (or retrieval) of preemptor job 250 might take place at printer 260, in which case the override signal sent by outgoing preemptor job handler 220 would not be the preemptor job 250 itself but would be a signal that might cause the preemptor job 250 to be created at or retrieved by printer 260 in response to receipt of the signal sent by outgoing preemptor job handler 220. The term "preemptor job 250" where it appears herein should therefore, except where otherwise clear from context, be understood to serve as shorthand for "preemptor job 250 or signal to create or retrieve preemptor job 250".

Remote override system 200 in the embodiment shown at FIG. 5 comprises remote device 210 and printer 260. Here, remote device 210 may send preemptor job 250 to printer 260 (or may send an override signal 150 that causes a preemptor job 250 to be created at or retrieved by printer 260) to cause remote override of power saving mode at printer 260.

Remote device 210 may include outgoing preemptor job handler 220 and computer 230.

A computer similar to computer 930 shown in FIG. 2 may be employed as computer 230 of remote device 210 in the embodiment shown at FIG. 5, in which case computer 230 at remote device 210 in the embodiment shown at FIG. 5 might have processor 231, data storage 232, communication interface 236, input/output unit 237, and bus 235.

A computer similar to computer 930 shown in FIG. 2 may be employed as computer 280 of printer 260 in the embodiment shown at FIG. 5, in which case computer 280 at printer 260 in the embodiment shown at FIG. 5 might have processor 281, data storage 282, communication interface 286, input/output unit 287, and bus 285.

Outgoing preemptor job handler 220 may be capable of creating a preemptor job 250 and may be capable of sending this preemptor job 250 to printer 260. In some embodiments, outgoing preemptor job handler 220 may have functionality for automatic creation of a preemptor job 250 which when sent to printer 260 by way of communication interface 236 of computer 230 is capable of causing override of power saving mode at printer 260. In some embodiments, outgoing preemptor job handler 220 may have functionality for causing a user interface at input/output unit 237 of computer 230 to prompt and/or accept input from a user, and may have functionality for creating a preemptor job 250 based on input received from the user.

Communication interface 236 of computer 230 at remote device 210 is at least capable of sending preemptor job 250 to printer 260 and is preferably also capable of receiving various communications from printer 260.

Printer 260 may include incoming preemptor job handler 270, computer 280, imaging unit 290, and power saving mode controller 295.

In some embodiments, imaging unit 290 at printer 260 may include job layer functionality for control and/or routing of print jobs to be printed at printer 260. In some embodiments, printer 260 may include page description language (PDL) interpreter(s) or other such functionality for interpreting and carrying out print instructions. In some embodiments, printer 260 may include a raster image processor (RIP) or other such functionality for converting print data to bitmap or other format suitable for direct input to printhead drivers. In some embodiments, data to be printed may be made available to imaging unit 290 of printer 260 in bitmap form by a graphical device interface (GDI) and/or by a separate RIP, for example.

In some embodiments, imaging unit 290 may be configured to carry out printing of print data in the form of print jobs received via communication interface 286 of computer 280 at printer 260. In some embodiments, print data might be received at printer 260 via communication interface 286 and/or data storage 282 of computer 280 at printer 260 or via a USB thumb drive or other such removable storage device which might, for example, be inserted into a removable storage interface at data storage 282 or input/output unit 287 of computer 280 at printer 260.

Incoming preemptor job handler 270 may be capable of receiving a preemptor job 250 from remote device 210 (or of creating or retrieving a preemptor job 250 in response to receipt of an override signal 150 from remote device 210) and may be capable of overriding power saving mode at printer 260 in correspondence to that preemptor job 250.

Communication interface 286 of computer 280 at printer 260 is at least capable of receiving preemptor job 250 (or an override signal 150 for causing printer 260 to create or retrieve preemptor job 250) from remote device 210 and is preferably also capable of sending various communications to remote device 210.

Figure 6:
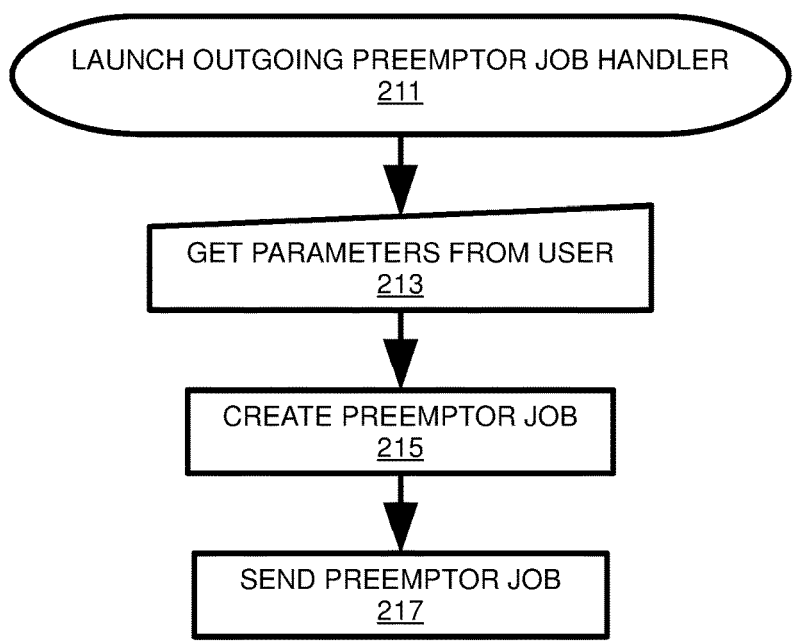
FIG. 6 is a flowchart showing flow of processing that might take place at remote device 210 in remote override system 200 shown in FIG. 5.

Referring to FIG. 6, flow of processing such as might take place at remote device 210 in remote override system 200 shown in FIG. 5 will now be described.

At remote override system 200 in accordance with the embodiment shown at FIG. 5, a user at remote device 210 may override the power saving mode of printer 260 by causing a preemptor print job 250 to be sent from remote device 210 to printer 260 (or by causing an override signal 150 to be sent from remote device 210 to cause a preemptor job 250 to be created at or retrieved by printer 260).

At step 211 in the flowchart shown in FIG. 6, a user at a remote device 210 might operate a touchscreen, mouse, keyboard, and/or other such input device of a user interface at input/output unit 237 of computer 230 at remote device 210 to launch outgoing preemptor job handler 220.

The functionality of outgoing preemptor job handler 220 may be incorporated into a desktop application, mobile application, printer driver, web browser, terminal communication program, communication applet or utility, and/or any other suitable hardware, firmware, and/or software, or any combination of hardware, firmware, and/or software capable of creating and/or sending preemptor job 250 to printer 260 (or capable of causing an override signal 150 to be sent from remote device 210 to cause a preemptor job 250 to be created at or retrieved by printer 260).

In some embodiments, preemptor job 250 (or an override signal 150 for causing a preemptor job 250 to be created at or retrieved by printer 260) might be sent automatically from remote device 210 when, for example, a printer driver or communication applet is launched at remote device 210, in which case the functionality of outgoing preemptor job handler 220 might be carried out by the printer driver or communication applet, for example.

In one embodiment, preemptor job 250 may be a "dummy" print job that does not cause printer 260 to print anything on print media but instead causes printer 260 to emerge (wake) from power saving mode and/or prevents printer 260 from entering power saving mode. For example, preemptor job 250 might be a print job or other data file containing an instruction understandable to the job layer, RIP, any other suitable component of imaging unit 290, and/or any other suitable component at printer 260, and capable of causing override of power saving mode at printer 260. In one embodiment preemptor job 250 might contain an instruction formatted after the fashion of a PRESCRIBE (registered trademark of Kyocera Corporation) instruction or other suitable page description language (PDL) instruction as in, for example, the exemplary command "@PJL SET REMOTE_RECOVERY=ON".

Where preemptor job 250 is such a print job, this may facilitate implementation of the invention in conventional printing systems, since it may be possible with only minor modification to utilize conventional print job layer interfaces and other conventional print job functionality for creation, sending, receipt, parsing, and/or processing of preemptor job 250. For example, a printer driver of the type present in many conventional printing systems might with only minor modification be made capable of creating preemptor job 250 automatically and/or responsive to input from the user such as is described below with reference to step 213 in the flowchart shown in FIG. 6. For example, in some embodiments, a user might cause immediate initiation of remote override to occur for a standard or default duration, and/or with a standard or default alteration of the inactivity timeout governing operation of power saving mode, by merely clicking on a button containing the words "Send remote override signal" or "Prepare engine" from within an Advanced tab of a Printing Preferences menu displayed by a printer driver when the user right-clicks on a context menu at a printer and/or printer queue menu item or icon, for example.

In some embodiments, preemptor job 250 may be previously stored at remote device 210 and/or printer 260 for later retrieval by remote device 210 and/or printer 260. In some embodiments, preemptor job 250 may be created at remote device 210 with or without input of parameter(s) by a user at remote device 210. In some embodiments, preemptor job 250 might not be previously stored at or created at remote device 210, remote device 210 instead sending an override signal 150 to printer 260 to cause printer 260 to create preemptor job 250 or to retrieve preemptor job 250 from a location at printer 260, remote device 210, or some other location from which it might be retrievable by printer 260. Especially where override signal 150 is of smaller data size than preemptor job 250, it may improve speed and/or reliability with which override is carried out if preemptor job 250 is previously stored at printer 260 or is otherwise retrievable by incoming preemptor job handler 270 of printer 260, and if receipt of override signal 150 by printer 260 is made to serve as trigger for retrieval by incoming preemptor job handler 270 of preemptor job 250, preemptor job 250 thereafter being used instead of or in addition to override signal 150 to cause override of power saving mode at printer 260.

In some embodiments, a standard or default preemptor job 250 might have been previously stored at remote device 210, in which case step 213 might be omitted. In some embodiments, preemptor job 250 might be sent automatically when, for example, a printer driver is launched, in which case the functionality of outgoing preemptor job handler 220 would in a preferred embodiment be carried out by the printer driver.

At step 213 in the flowchart shown in FIG. 6, entry of parameter(s) (or omission of step 213 where there is no need to get parameters for creation of preemptor job 250 from the user) is similar to that described with reference to step 113 of the flowchart shown in FIG. 3, it being possible in various embodiments for a user to enter and/or select any combination of the various parameters, e.g., remote override initiation date and/or time, remote override duration, and/or altered inactivity timeout, described with reference to step 113 in the flowchart shown in FIG. 3, and/or for any combination of such parameters to be entered automatically as described with reference to step 113 for creation of override signal 150.

At step 215 in the flowchart shown in FIG. 6, outgoing preemptor job handler 220 may create preemptor job 250 in similar fashion as described with reference to step 115 of the flowchart shown in FIG. 3 for creation of override signal 150.

At step 217 in the flowchart shown in FIG. 6, the preemptor job 250 (or an override signal 150 for causing creation of a preemptor job 250 at printer 260) is sent to printer 260 by way of communication interface 236 of computer 230 at remote device 210.

Figure 7:
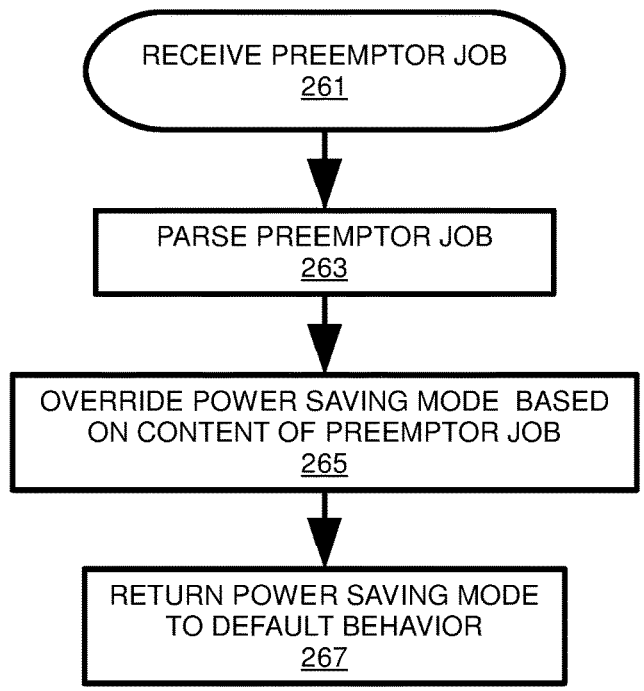
FIG. 7 is a flowchart showing flow of processing that might take place at printer 260 in remote override system 200 shown in FIG. 5.

Referring to FIG. 7, flow of processing such as might take place at printer 260 in remote override system 200 shown in FIG. 5 will now be described.

At step 261 in the flowchart shown in FIG. 7, a preemptor job 250 (or an override signal 150 for causing creation of a preemptor job 250) might be received from remote device 210 by way of communication interface 286 of computer 280 at printer 260.

Thereafter, at step 263 in the flowchart shown in FIG. 7, parsing of the preemptor job 250 received at step 261 by incoming preemptor job handler 270 is similar to parsing of override signal 150 by incoming override signal handler 170 described with reference to step 163 of the flowchart shown in FIG. 4. Where remote device 210 does not send a preemptor job 250 to printer 260 but instead sends an override signal 150 for causing creation of a preemptor job 250 at printer 260, incoming preemptor job handler 270 might create (or retrieve) preemptor job 250 in response to receipt of override signal 150 from remote device 210, and the preemptor job 250 created or retrieved might be parsed at step 263.

In the present embodiment, because override signal 150 sent from remote device 210 takes the form of a preemptor job 250 (or override signal 150 sent from remote device 210 causes creation or retrieval by incoming preemptor job handler 270 of a preemptor job 250) which may be in a format readily understood by the job layer, RIP, or other suitable component at printer 260, this may facilitate implementation of the invention in conventional printing systems, since it may be possible with only minor modification to utilize conventional print job layer interfaces and other conventional print job functionality for creation, sending, receipt, parsing, and/or processing of preemptor job 250.

Overriding of power saving mode at step 265 of the flowchart shown in FIG. 7 is similar to that described with reference to step 165 of the flowchart shown in FIG. 4.

Return of printer 260 to its standard or default power saving mode behavior at step 267 of the flowchart shown in FIG. 7 is similar to that described with reference to step 167 of the flowchart shown in FIG. 4.

Figure 8:
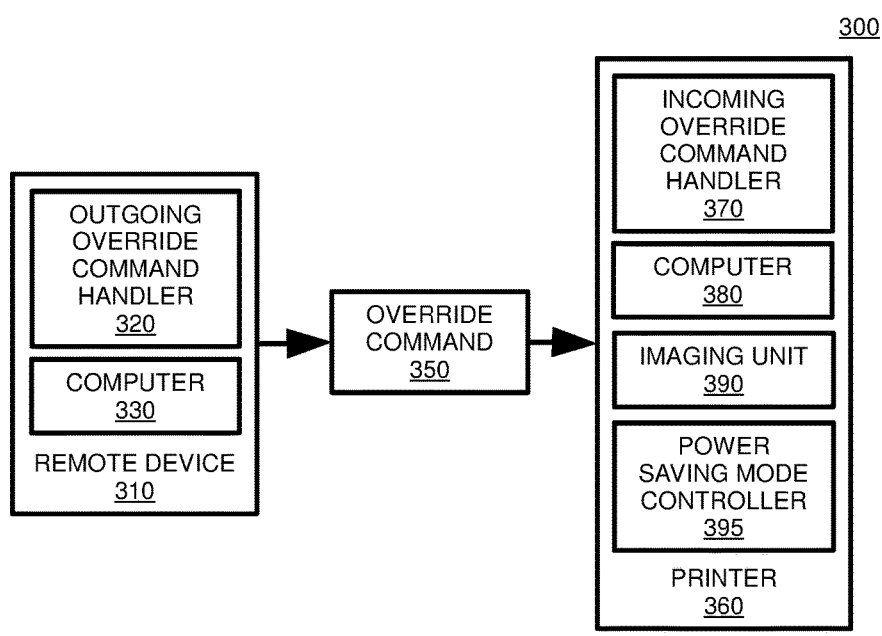
FIG. 8 is a functional block diagram of a remote override system 300 in which remote device 310 sends override command 350 to printer 360 to cause remote override of power saving mode at printer 360 in accordance with an embodiment of the present invention.

FIG. 8 is a functional block diagram of a remote override system 300 in an embodiment in which the override signal 150 of remote override system 100 described with reference to FIG. 1 takes the form of an override command 350 which is sent from remote device 310 to printer 360 serving as local device 160. At remote override system 300 shown in FIG. 8, printer 360 has imaging unit 390 serving as power consuming unit 190.

Remote override system 300 shown in FIG. 8 being similar in many respects to remote override system 100 shown in FIG. 1 and/or remote override system 200 shown in FIG. 5, like parts have been given like reference numerals and description thereof will be omitted.

Although outgoing override command handler 320 is for convenience shown in FIG. 8 as creating override command 350 which is sent to and received by incoming override command handler 370, in some embodiments creation (or retrieval) of override command 350 might take place at printer 360, in which case the override signal sent by outgoing override command handler 320 would not be the override command 350 itself but would be a signal that might cause the override command 350 to be created at or retrieved by printer 360 in response to receipt of the override signal sent by outgoing override command handler 320. The term "override command 350" where it appears herein should therefore, except where otherwise clear from context, be understood to serve as shorthand for "override command 350 or signal to create or retrieve override command 350".

Remote override system 300 in the embodiment shown at FIG. 8 comprises remote device 310 and printer 360. Here, remote device 310 may send override command 350 to printer 360 (or may send an override signal 150 that causes an override command 350 to be created at or retrieved by printer 360) to cause remote override of power saving mode at printer 360.

Remote device 310 may include outgoing override command handler 320 and computer 330.

A computer similar to computer 930 shown in FIG. 3 may be employed as computer 330 of remote device 310 in the embodiment shown at FIG. 8, in which case computer 330 at remote device 310 in the embodiment shown at FIG. 8 might have processor 331, data storage 332, communication interface 336, input/output unit 337, and bus 335.

A computer similar to computer 930 shown in FIG. 3 may be employed as computer 380 of printer 360 in the embodiment shown at FIG. 8, in which case computer 380 at printer 360 in the embodiment shown at FIG. 8 might have processor 381, data storage 382, communication interface 386, input/output unit 387, and bus 385.

Outgoing override command handler 320 may be capable of creating an override command 350 and may be capable of sending this override command 350 to printer 360. In some embodiments, outgoing override command handler 320 may have functionality for automatic creation of an override command 350 which when sent to printer 360 by way of communication interface 336 of computer 330 is capable of causing override of power saving mode at printer 360. In some embodiments, outgoing override command handler 320 may have functionality for causing a user interface at input/output unit 337 of computer 330 to prompt and/or accept input from a user, and may have functionality for creating an override command 350 based on input received from the user.

Communication interface 336 of computer 330 at remote device 310 is at least capable of sending override command 350 to printer 360 and is preferably also capable of receiving various communications from printer 360.

Printer 360 may include incoming override command handler 370, computer 380, imaging unit 390, and power saving mode controller 395.

In some embodiments, imaging unit 390 at printer 360 may include job layer functionality for control and/or routing of print jobs to be printed at printer 360. In some embodiments, printer 360 may include page description language (PDL) interpreter(s) or other such functionality for interpreting and carrying out print instructions. In some embodiments, printer 360 may include a raster image processor (RIP) or other such functionality for converting print data to bitmap or other format suitable for direct input to printhead drivers. In some embodiments, data to be printed may be made available to imaging unit 390 of printer 360 in bitmap form by a graphical device interface (GDI) and/or by a separate RIP, for example.

In some embodiments, imaging unit 390 may be configured to carry out printing of print data in the form of print jobs received via communication interface 386 of computer 380 at printer 360. In some embodiments, print data might be received at printer 360 via communication interface 386 and/or data storage 382 of computer 380 at printer 360 or via a USB thumb drive or other such removable storage device which might, for example, be inserted into a removable storage interface at data storage 382 or input/output unit 387 of computer 380 at printer 360.

Incoming override command handler 370 may be capable of receiving an override command 350 from remote device 310 (or of creating or retrieving an override command 350 in response to receipt of an override signal 150 from remote device 310) and may be capable of overriding power saving mode at printer 360 in correspondence to that override command 350.

Communication interface 386 of computer 380 at printer 360 is at least capable of receiving override command 350 (or an override signal 150 for causing printer 360 to create or retrieve override command 350) from remote device 310 and is preferably also capable of sending various communications to remote device 310.

Figure 9:
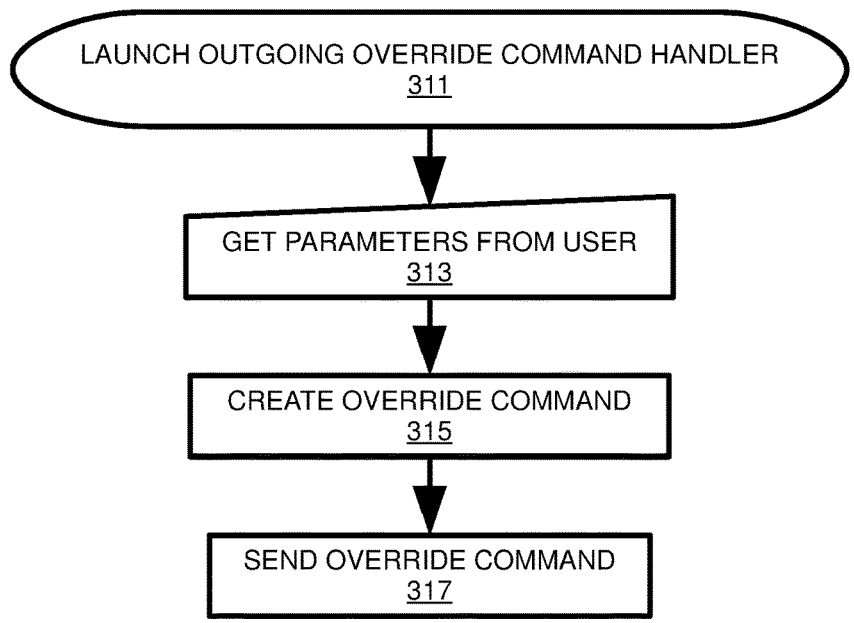
FIG. 9 is a flowchart showing flow of processing that might take place at remote device 310 in remote override system 300 shown in FIG. 8.

Referring to FIG. 9, flow of processing such as might take place at remote device 310 in remote override system 300 shown in FIG. 8 will now be described.

At remote override system 300 in accordance with the embodiment shown at FIG. 8, a user at remote device 310 may override the power saving mode of printer 360 by causing an override command 350 to be sent from remote device 310 to printer 360 (or by causing an override signal 150 to be sent from remote device 310 to cause an override command 350 to be created at or retrieved by printer 360).

At step 311 in the flowchart shown in FIG. 9, a user at a remote device 310 might operate a touchscreen, mouse, keyboard, and/or other such input device of a user interface at input/output unit 337 of computer 330 at remote device 310 to launch outgoing override command handler 320.

The functionality of outgoing override command handler 320 may be incorporated into a desktop application, mobile application, printer driver, web browser, terminal communication program, communication applet or utility, and/or any other suitable hardware, firmware, and/or software, or any combination of hardware, firmware, and/or software capable of creating and/or sending override command 350 to printer 360 (or capable of causing an override signal 150 to be sent from remote device 310 to cause an override command 350 to be created at or retrieved by printer 360).

In some embodiments, override command 350 (or an override signal 150 for causing an override command 350 to be created at or retrieved by printer 360) might be sent automatically from remote device 310 when, for example, a printer driver or communication applet is launched at remote device 310, in which case the functionality of outgoing override command handler 320 might be carried out by the printer driver or communication applet, for example.

In some embodiments, outgoing override command handler 320 may be a web browser or terminal communication program launched at remote device 310, for example. In some embodiments, the functionality of outgoing override signal handler 320 may be carried out by a web browser executed by computer 330 of remote device 310 to access a web page or control panel settings page hosted by printer 360.

In some embodiments, override command 350 may be a command, sent from remote device 310 by way of communication interface 336 of computer 330 to printer 360 by way of communication interface 386 of computer 380, for causing remote override of power saving mode at printer 360.

In some embodiments, override command 350 may be a message or instruction for causing remote override of power saving mode at printer 360 that takes the form of network packet(s) capable of being routed from remote device 310 by way of communication interface 336 of computer 330 to printer 360 by way of communication interface 386 of computer 380.

In an embodiment incorporating aspects of remote override system 200 shown in FIG. 5 and aspects of remote override system 300 shown in FIG. 8, override command 350 may cause creation or retrieval by remote device 310 or printer 360 of a preemptor job 250 as described with reference to remote override system 200 shown in FIG. 5.

In a preferred embodiment, outgoing override command handler 320 at remote device 310 is capable of creating and/or retrieving an override command 350 which when received by incoming override command handler 370 at outgoing override command handler 320 is capable of causing printer 360 to emerge (wake) from power saving mode and/or prevents printer 360 from entering power saving mode. For example, override command 350 might be an instruction understandable by the RIP or any other suitable component of imaging unit 390 and/or any other suitable component at printer 360.

For example, in some embodiments, a printer driver or communication applet might be capable of creating override command 350 automatically and/or responsive to input from the user such as is described below with reference to step 313 in the flowchart shown in FIG. 9. For example, in some embodiments, a user might cause immediate initiation of remote override to occur for a standard or default duration, and/or with a standard or default alteration of the inactivity timeout governing operation of power saving mode, by merely clicking on a button containing the words "Send remote override signal" or "Prepare engine" from within an Advanced tab of a Printing Preferences menu displayed by a printer driver when the user right-clicks on a context menu at a printer and/or printer queue menu item or icon, for example.

In some embodiments, override command 350 may be previously stored at remote device 310 and/or printer 360 for later retrieval by remote device 310 and/or printer 360. In some embodiments, override command 350 may be created at remote device 310 with or without input of parameter(s) by a user at remote device 310. In some embodiments, override command 350 might not be previously stored at or created at remote device 310, remote device 310 instead sending an override signal 150 to printer 360 to cause printer 360 to create override command 350 or to retrieve override command 350 from a location at printer 360, remote device 310, or some other location from which it might be retrievable by printer 360. Especially where override signal 150 is of smaller data size than override command 350, it may improve speed and/or reliability with which override is carried out if override command 350 is previously stored at printer 360 or is otherwise retrievable by incoming override command handler 370 of printer 360, and if receipt of override signal 150 by printer 360 is made to serve as trigger for retrieval by incoming override command handler 370 of override command 350, override command 350 thereafter being used instead of or in addition to override signal 150 to cause override of power saving mode at printer 360.

In some embodiments, a standard or default override command 350 might have been previously stored at remote device 310, in which case step 313 might be omitted. In some embodiments, override command 350 might be sent automatically when, for example, a printer driver is launched, in which case the functionality of outgoing override command handler 320 would in a preferred embodiment be carried out by the printer driver.

At step 313 in the flowchart shown in FIG. 9, entry of parameter(s) (or omission of step 313 where there is no need to get parameters for creation of override command 350 from the user) is similar to that described with reference to step 113 of the flowchart shown in FIG. 3 and step 213 of the flowchart shown in FIG. 6, it being possible in various embodiments for a user to enter and/or select any combination of the various parameters, e.g., remote override initiation date and/or time, remote override duration, and/or altered inactivity timeout, described with reference to step 113 in the flowchart shown in FIG. 3 or step 213 of the flowchart shown in FIG. 6, and/or for any combination of such parameters to be entered automatically as described with reference to step 113 for creation of override signal 150 or step 213 of the flowchart shown in FIG. 6.

At step 315 in the flowchart shown in FIG. 9, outgoing override command handler 320 may create override command 350 in similar fashion as described with reference to step 115 of the flowchart shown in FIG. 3 for creation of override signal 150 or step 215 of the flowchart shown in FIG. 6 for creation of preemptor job 250.

At step 317 in the flowchart shown in FIG. 9, the override command 350 (or an override signal 150 for causing creation of an override command 350 at printer 360) is sent to printer 360 by way of communication interface 336 of computer 330 at remote device 310.

Figure 10:
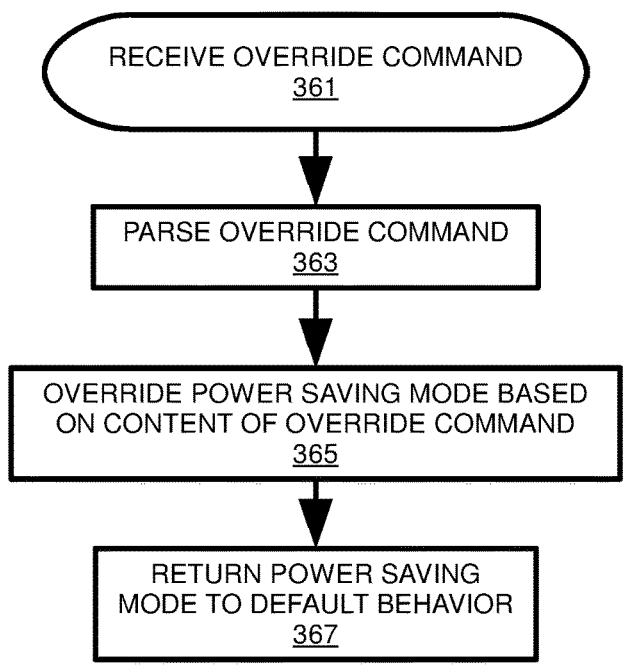
FIG. 10 is a flowchart showing flow of processing that might take place at printer 360 in remote override system 300 shown in FIG. 8.

Referring to FIG. 10, flow of processing such as might take place at printer 360 in remote override system 300 shown in FIG. 8 will now be described.

At step 361 in the flowchart shown in FIG. 10, an override command 350 (or an override signal 150 for causing creation of an override command 350) might be received from remote device 310 by way of communication interface 386 of computer 380 at printer 360.

Thereafter, at step 363 in the flowchart shown in FIG. 10, parsing of the override command 350 received at step 361 by incoming override command handler 370 is similar to parsing of override signal 150 by incoming override signal handler 170 described with reference to step 163 of the flowchart shown in FIG. 4 and/or parsing of preemptor job 250 by incoming preemptor job handler 270 described with reference to step 263 of the flowchart shown in FIG. 7. Where remote device 310 does not send an override command 350 to printer 360 but instead sends an override signal 150 for causing creation of an override command 350 at printer 360, incoming override command handler 370 might create (or retrieve) override command 350 in response to receipt of override signal 150 from remote device 310, and the override command 350 created or retrieved might be parsed at step 363.

In the present embodiment, because override signal 150 sent from remote device 310 takes the form of an override command 350 (or override signal 150 sent from remote device 310 causes creation or retrieval by incoming override command handler 370 of an override command 350) which is preferably readily understood by the RIP and/or other suitable component at printer 360, this may in some embodiments permit convenient bypassing of power saving mode controller 395 or other components at remote device 310 for direct override by remote device 310 of the power saving mode at remote device 310.

Overriding of power saving mode at step 365 of the flowchart shown in FIG. 10 is similar to that described with reference to step 165 of the flowchart shown in FIG. 4 and step 265 of the flowchart shown in FIG. 7.

Return of printer 360 to its standard or default power saving mode behavior at step 367 of the flowchart shown in FIG. 10 is similar to that described with reference to step 167 of the flowchart shown in FIG. 4 and step 267 of the flowchart shown in FIG. 7.

While embodiments of the present invention have been described above, modes of carrying out the present invention are not limited to the foregoing embodiments, a great many further variations being possible without departing from the gist of the present invention. Where a single computer has been shown and/or described for implementation of some of the various functionalities herein, there is no objection to distributed processing in which a plurality of computers are employed for implementation of such functionalities. For any of the various function(s) described with reference to one or more of the flowcharts in the attached drawings, so long as it would not interfere with ability to carry out the function(s) in question, the order of steps may be different from that described herein.

What is claimed is:

1. A local device comprising:
   a computer having a processor, a communication interface, and a non-transitory computer-readable medium for storing instructions; and
   an incoming override signal handler capable of
      receiving an override signal from a remote device by way of the communication interface, and
      overriding a power saving mode at the local device based on the override signal;
   wherein the override signal is a dummy print job created by a printer driver in response to an operation of a user at the remote device who wishes to override a power saving mode at an imaging unit of the local device;
   wherein, when the local device has not received the override signal, absence of activity at the local device for an inactivity timeout period causes the imaging unit of the local device to enter the power saving mode; and
   wherein, when the local device has received the override signal, absence of the activity at the local device for the inactivity timeout period does not cause the imaging unit of the local device to enter the power saving mode.

2. The local device according to claim 1
wherein the incoming override signal handler overrides the power saving mode of the local device substantially immediately upon receipt of the override signal by the local device.

3. The local device according to claim 1
wherein the incoming override signal handler initiates the override of the power saving mode of the local device at a time following receipt of the override signal by the local device.

4. The local device according to claim 1
wherein the incoming override signal handler causes the power saving mode of the local device to be overridden for a finite duration.

5. The local device according to claim 4
wherein following the overriding of the power saving mode for the finite duration, the local device is made to return to the power saving mode that existed prior to the overriding of the power saving mode.

6. The local device according to claim 1
wherein the incoming override signal handler causes the inactivity timeout period to be altered.

7. The local device according to claim 6
wherein the alteration of the inactivity timeout period by the incoming override signal handler causes the inactivity timeout period to be shorter following the alteration than it was before the alteration.

8. The local device according to claim 6
wherein the alteration of the inactivity timeout period by the incoming override signal handler causes the inactivity timeout period to be longer following the alteration than it was before the alteration.

9. The local device according to claim 6
wherein following conclusion of the overriding of the power saving mode, the inactivity timeout period is not returned to what it was before the alteration but continues to be what it was after the alteration.

10. The local device according to claim 1
wherein the local device further comprises a power saving mode controller; and
wherein the inactivity timeout period, expiration of which when there is no activity at the local device serves as trigger for the power saving mode controller to put the local device into the power saving mode, is altered by the incoming override signal handler following receipt of the override signal by the local device.

11. The local device according to claim 1
wherein the local device comprises a printer.

12. The local device according to claim 11
wherein the local device is a multifunction peripheral that includes functionality of at least one species selected from among the group consisting of image scanner, facsimile machine, copy machine, and document storage device.

13. The local device according to claim 11
wherein the override signal received by the incoming override signal handler is a preemptor job capable of causing the overriding of the power saving mode at the local device.

14. The local device according to claim 13
wherein an imaging unit at the local device is capable of causing the overriding of the power saving mode upon execution of the preemptor job.

15. The local device according to claim 14
wherein the preemptor job that causes the overriding of the power saving mode is executed by a job layer at the local device.

16. The local device according to claim 14
wherein the preemptor job that causes the overriding of the power saving mode is executed by a raster image processor at the local device.

17. The local device according to claim 1
wherein the imaging unit of the local device performs at least one operation selected from among the group consisting of conversion of print data to bitmap, printing of print data on print media, and capture of an image from an original.

18. A remote override system comprising:
a remote device including
   a remote device computer having
      a remote device processor,
      a remote device communication interface, and
      a remote device non-transitory computer-readable medium for storing remote device instructions, and
   an outgoing override signal handler capable of sending an override signal by way of the remote device communication interface; and
a local device including
   a local device computer having
      a local device processor,
      a local device communication interface, and
      a local device non-transitory computer-readable medium for storing local device instructions, and
   an incoming override signal handler capable of receiving the override signal by way of the local device communication interface;
wherein the override signal is a dummy print job created by a printer driver in response to an operation of a user at the remote device who wishes to override a power saving mode at an imaging unit of the local device;
wherein, when the local device has not received the override signal, absence of activity at the local device for an inactivity timeout period causes the imaging unit of the local device to enter the power saving mode; and
wherein, when the local device has received the override signal, absence of the activity at the local device for the inactivity timeout period does not cause the imaging unit of the local device to enter the power saving mode.

19. A remote override method comprising:
receiving an override signal by an incoming override signal handler at a local device including a local device computer having a local device processor, a local device communication interface, and a local device non-transitory computer-readable medium for storing local device instructions; and
causing override of a power saving mode at the local device;
wherein the overriding of the power saving mode is carried out in correspondence to content of the override signal;
wherein the override signal is a dummy print job created by a printer driver in response to an operation of a user at a remote device who wishes to override a power saving mode at an imaging unit of the local device;
wherein, when the local device has not received the override signal, absence of activity at the local device for an inactivity timeout period causes the imaging unit of the local device to enter the power saving mode; and
wherein, when the local device has received the override signal, absence of the activity at the local device for the inactivity timeout period does not cause the imaging unit of the local device to enter the power saving mode.

* * * * *